US012749461B2

(12) United States Patent
Sakaigawa

(10) Patent No.: US 12,749,461 B2
(45) Date of Patent: Sep. 29, 2026

(54) DISPLAY PANEL, METHOD FOR DISPLAYING IMAGE, AND DISPLAY DEVICE

(71) Applicant: HUAWEI TECHNOLOGIES CO., LTD., Shenzhen (CN)

(72) Inventor: Akira Sakaigawa, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/909,969

(22) Filed: Oct. 9, 2024

(65) Prior Publication Data

US 2025/0069560 A1 Feb. 27, 2025

Related U.S. Application Data

(63) Continuation of application No. PCT/CN2022/101955, filed on Jun. 28, 2022.

(51) Int. Cl.
*G09G 5/02* (2006.01)
*G09G 3/34* (2006.01)
(Continued)

(52) U.S. Cl.
CPC ........... *G09G 3/3607* (2013.01); *G09G 3/344* (2013.01); *G09G 2300/0452* (2013.01);
(Continued)

(58) Field of Classification Search
CPC .. G09G 3/20; G09G 3/30; G09G 3/34; G09G 3/36; G09G 3/344; G09G 3/3607;
(Continued)

(56) References Cited

U.S. PATENT DOCUMENTS 7,876,339 B2 1/2011 Okazaki et al.
8,873,129 B2 10/2014 Paolini, Jr. et al.
(Continued)

FOREIGN PATENT DOCUMENTS

CN 101006484 A 7/2007
CN 100407276 C 7/2008
(Continued)

OTHER PUBLICATIONS

Specifications for Newsprint Advertising Production,Oct. 2011,https://img1.wsimg.com/blobby/go/67dcb9c4-0562-4a7b-a567-85fcea37d7a5/downloads/SNAP_2011_V_3.pdf?ver=1627519253913,total 100 pages.

*Primary Examiner* — Chanh D Nguyen
*Assistant Examiner* — Nguyen H Truong

(57) ABSTRACT

Present application provides a display panel comprising a plurality of pixel units. Each pixel unit consists of two sub-pixels and colors of the two sub-pixels of the each pixel unit are in a complementary color relationship. Each pixel unit produces a white point when the two sub-pixels are together set to a first state and produce a black point when the two sub-pixels are together set to a second state. The plurality of pixel units comprise a plurality of first pixel units and a plurality of second pixel units that are alternately arranged. The two sub-pixels in each of the first pixel units have a first pair of colors in a complementary color relationship, and the two sub-pixels in each of the second pixel units have a second pair of colors in a complementary color relationship.

17 Claims, 18 Drawing Sheets

(51) Int. Cl.
*G09G 3/36* (2006.01)
*H10K 59/35* (2023.01)

(52) U.S. Cl.
CPC . *G09G 2300/0842* (2013.01); *G09G 2340/06* (2013.01); *G09G 2380/14* (2013.01)

(58) Field of Classification Search
CPC ...... G09G 3/3291; G09G 3/3266; G09G 5/02; G09G 5/10; G09G 2300/0452; G09G 2300/0842; G09G 2340/06; G09G 2380/14; H10K 59/12; H10K 59/121; H10K 59/65; H10K 59/122; H10K 71/00; H04N 5/225; H04N 9/04; H04N 9/73; G02F 1/167; G02F 1/1335; G02B 5/20
See application file for complete search history.

(56) References Cited

U.S. PATENT DOCUMENTS

| | | | | |
|---|---|---|---|---|
| 2002/0191009 | A1 | 12/2002 | Liang et al. | |
| 2002/0191130 | A1* | 12/2002 | Liang | G02F 1/133514 349/108 |
| 2005/0264587 | A1* | 12/2005 | Kurumisawa | G09G 3/2003 345/690 |
| 2007/0052887 | A1* | 3/2007 | Brown Elliot | G09G 3/2003 349/108 |
| 2007/0146242 | A1 | 6/2007 | Miller et al. | |
| 2007/0195230 | A1* | 8/2007 | Kuribayashi | G02F 1/133707 349/106 |
| 2007/0205972 | A1* | 9/2007 | Asao | G09G 3/3614 345/88 |
| 2008/0174849 | A1* | 7/2008 | Asao | G02F 1/133514 359/259 |
| 2009/0058777 | A1 | 3/2009 | Cheng | |
| 2009/0167657 | A1* | 7/2009 | Tomizawa | G09G 5/02 345/87 |
| 2016/0282667 | A1 | 9/2016 | Fan | |
| 2020/0374493 | A1* | 11/2020 | Jang | H04N 23/88 |
| 2022/0158139 | A1* | 5/2022 | Kim | G09F 9/3026 |

FOREIGN PATENT DOCUMENTS

| | | | |
|---|---|---|---|
| CN | 101211518 | A | 7/2008 |
| CN | 100510883 | C | 7/2009 |
| CN | 1722193 | B | 4/2013 |
| CN | 103177701 | A | 6/2013 |
| CN | 106328032 | A | 1/2017 |
| CN | 105676516 | B | 5/2019 |

* cited by examiner

【Fig. 1】
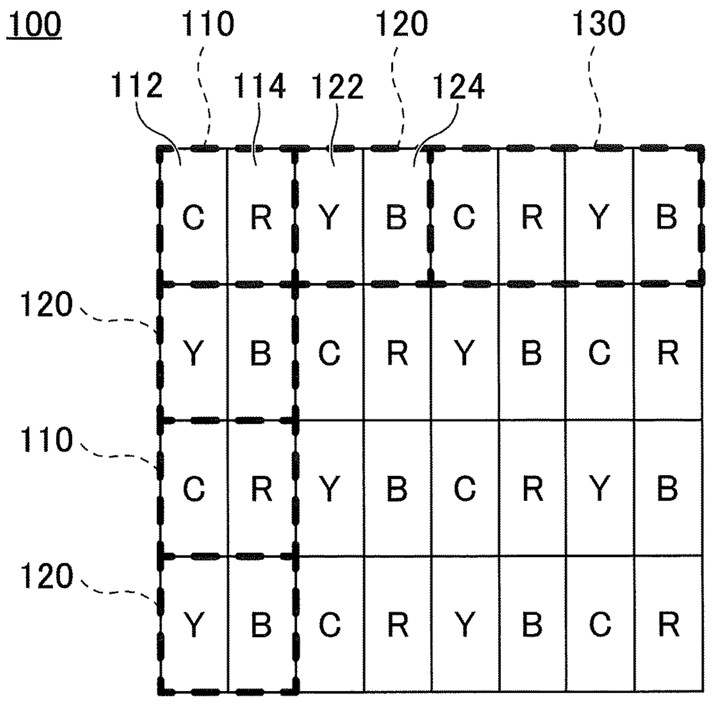

【FIG. 2】
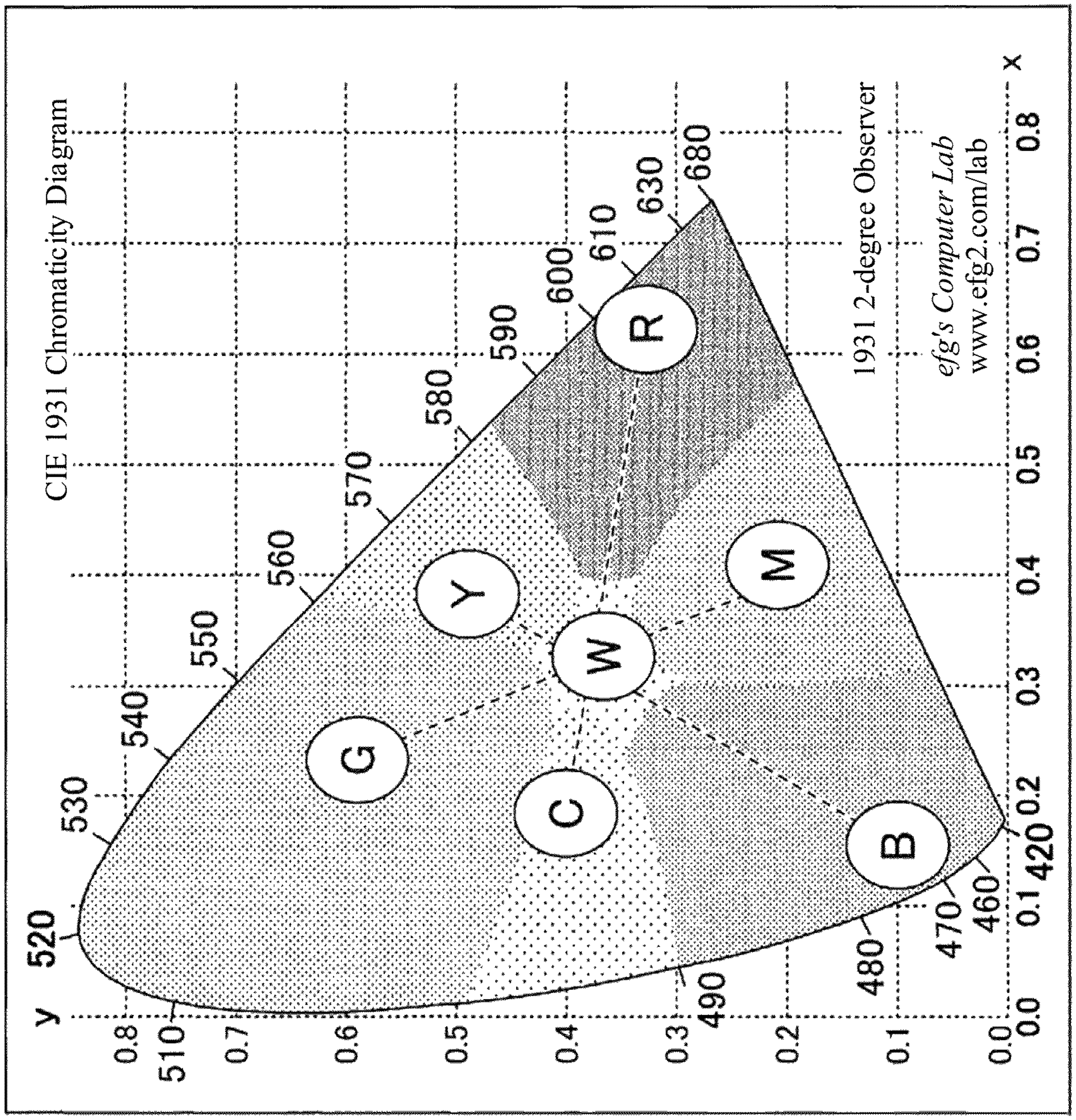

【Fig. 3A】
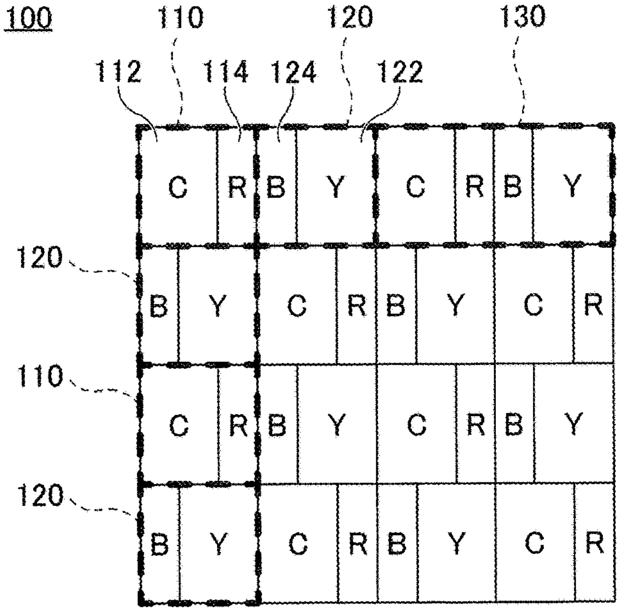
【Fig. 3B】
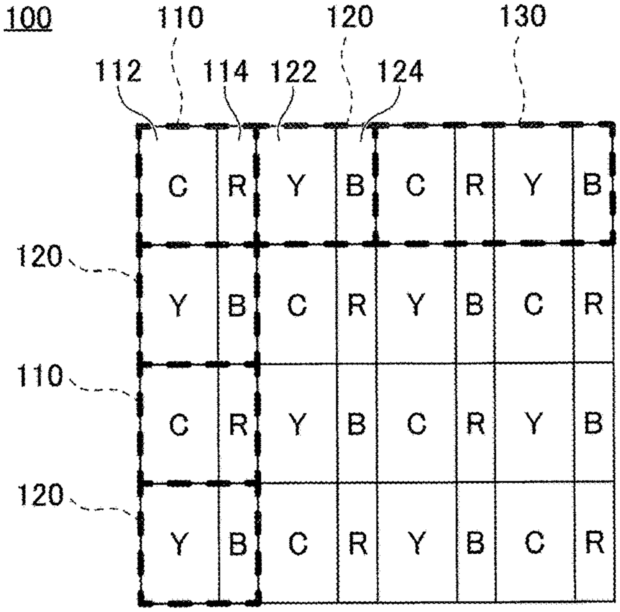

【Fig. 4A】
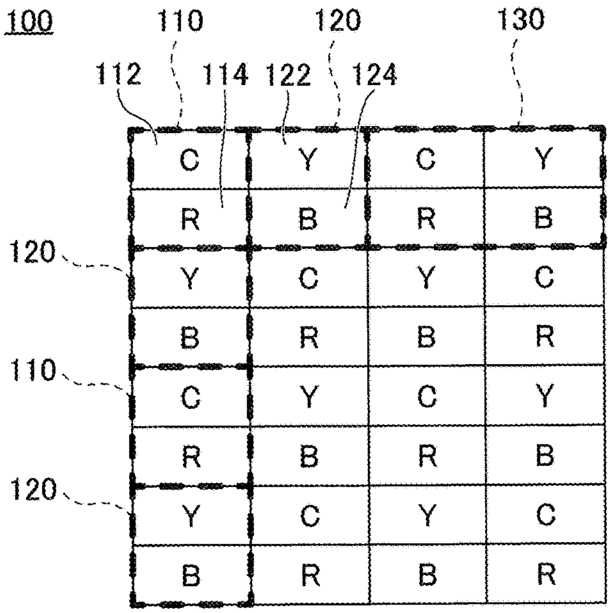
【Fig. 4B】
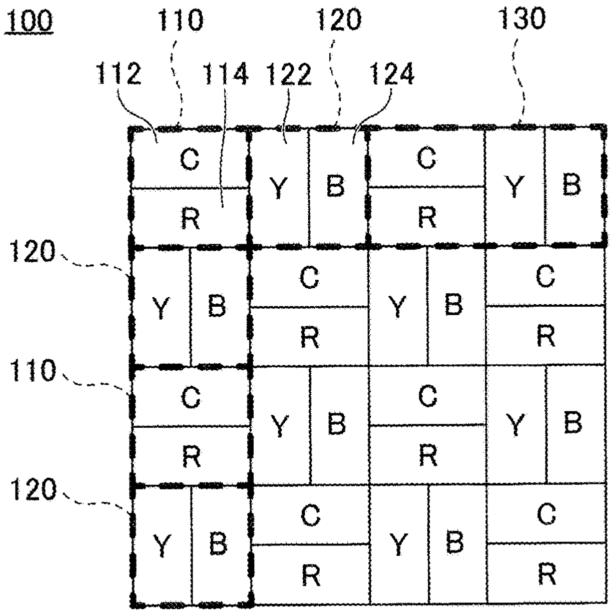

【Fig. 5】
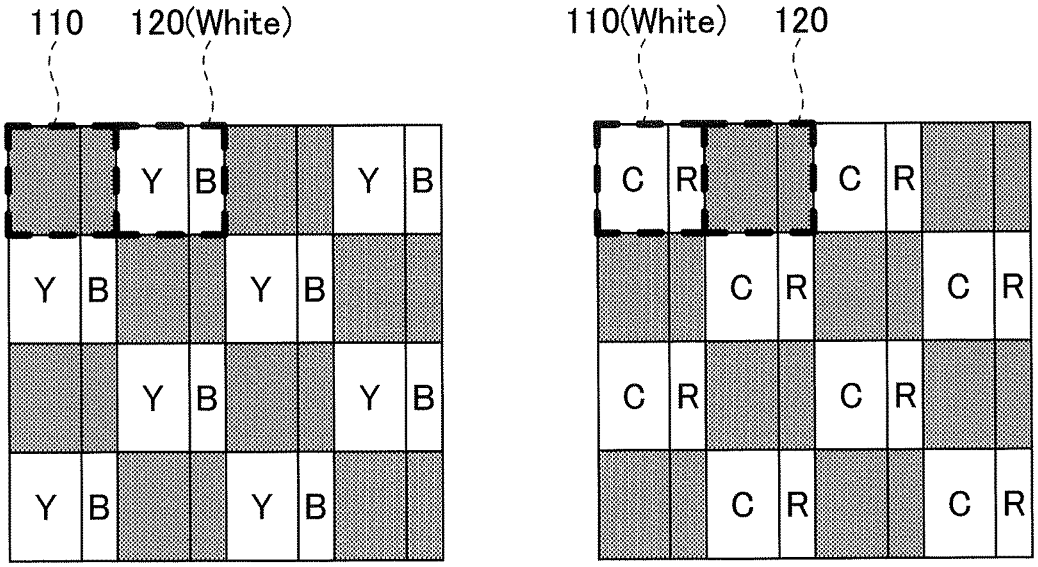

【FIG. 6】
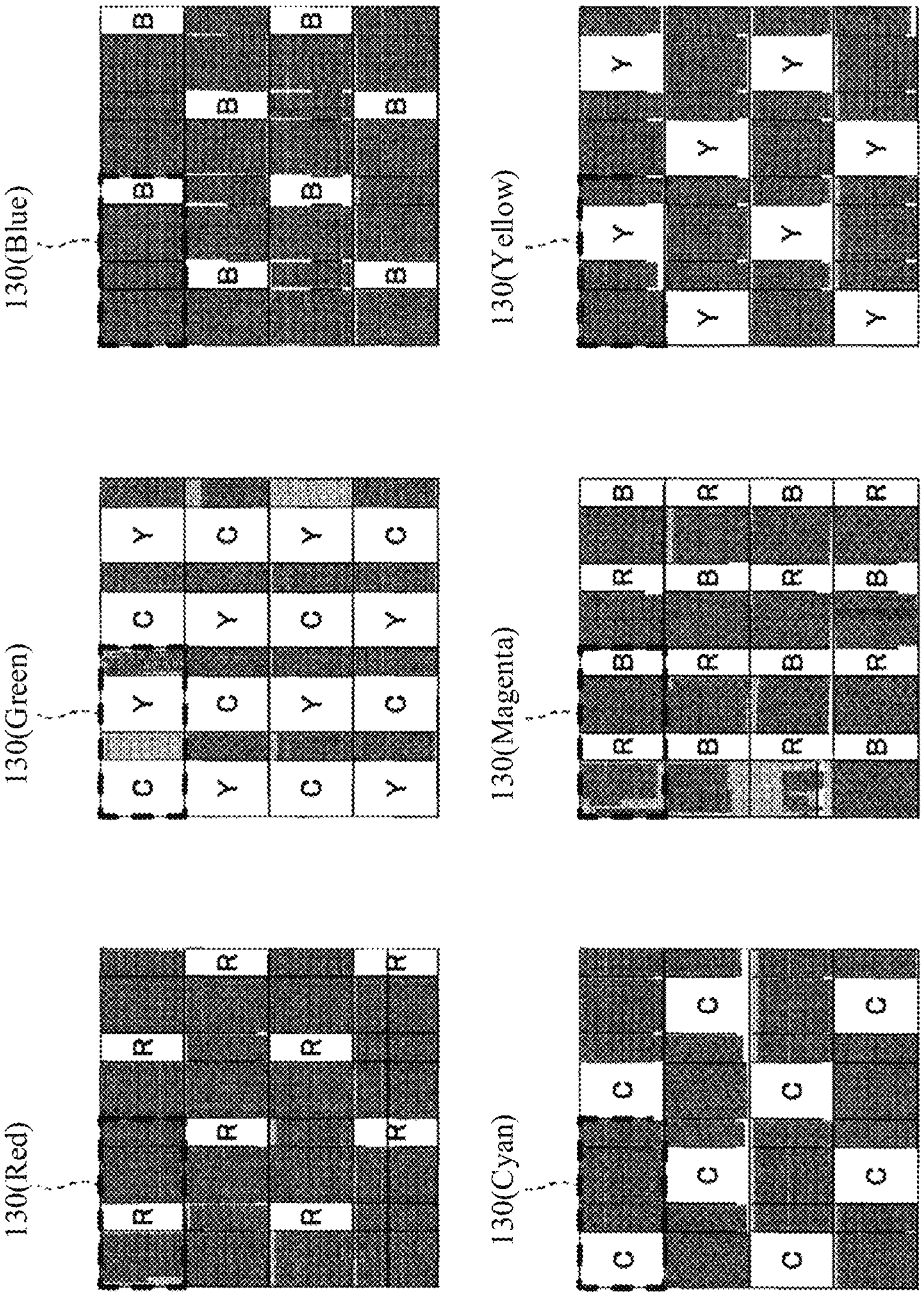

【FIG. 7】
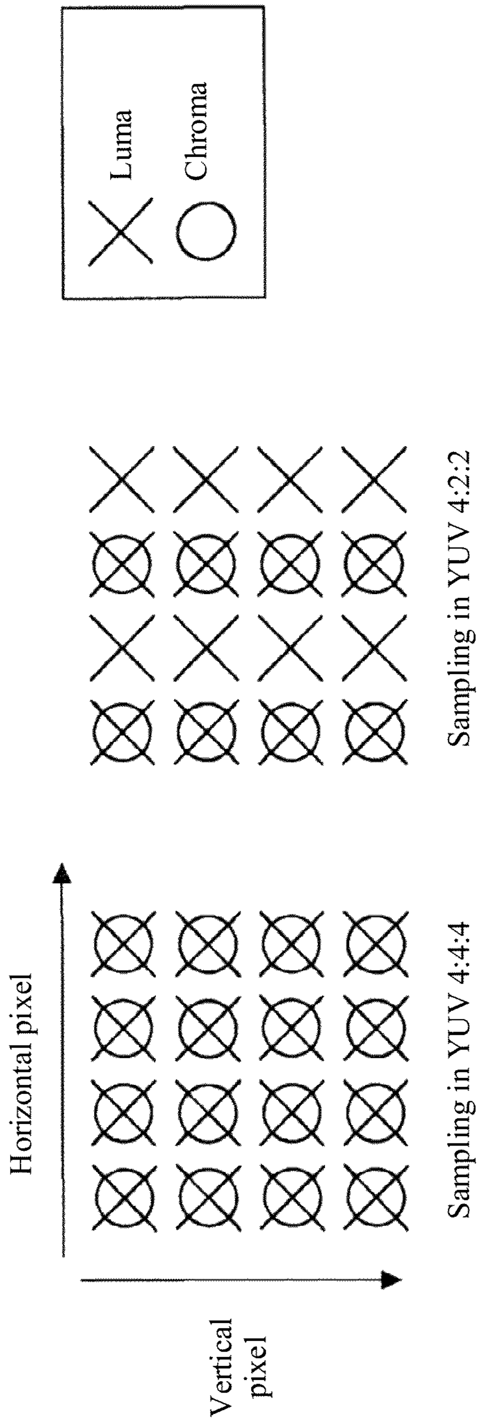

【FIG. 8A】
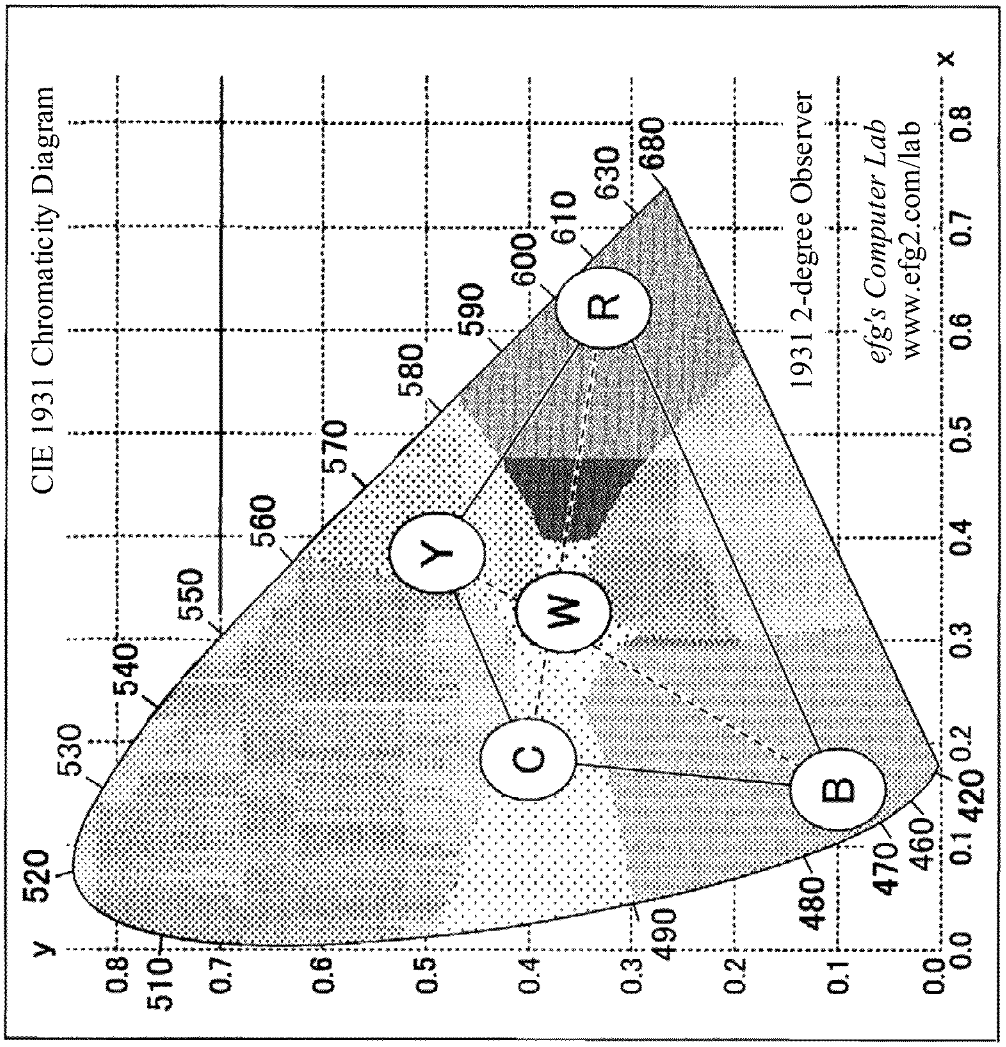

【FIG. 8B】
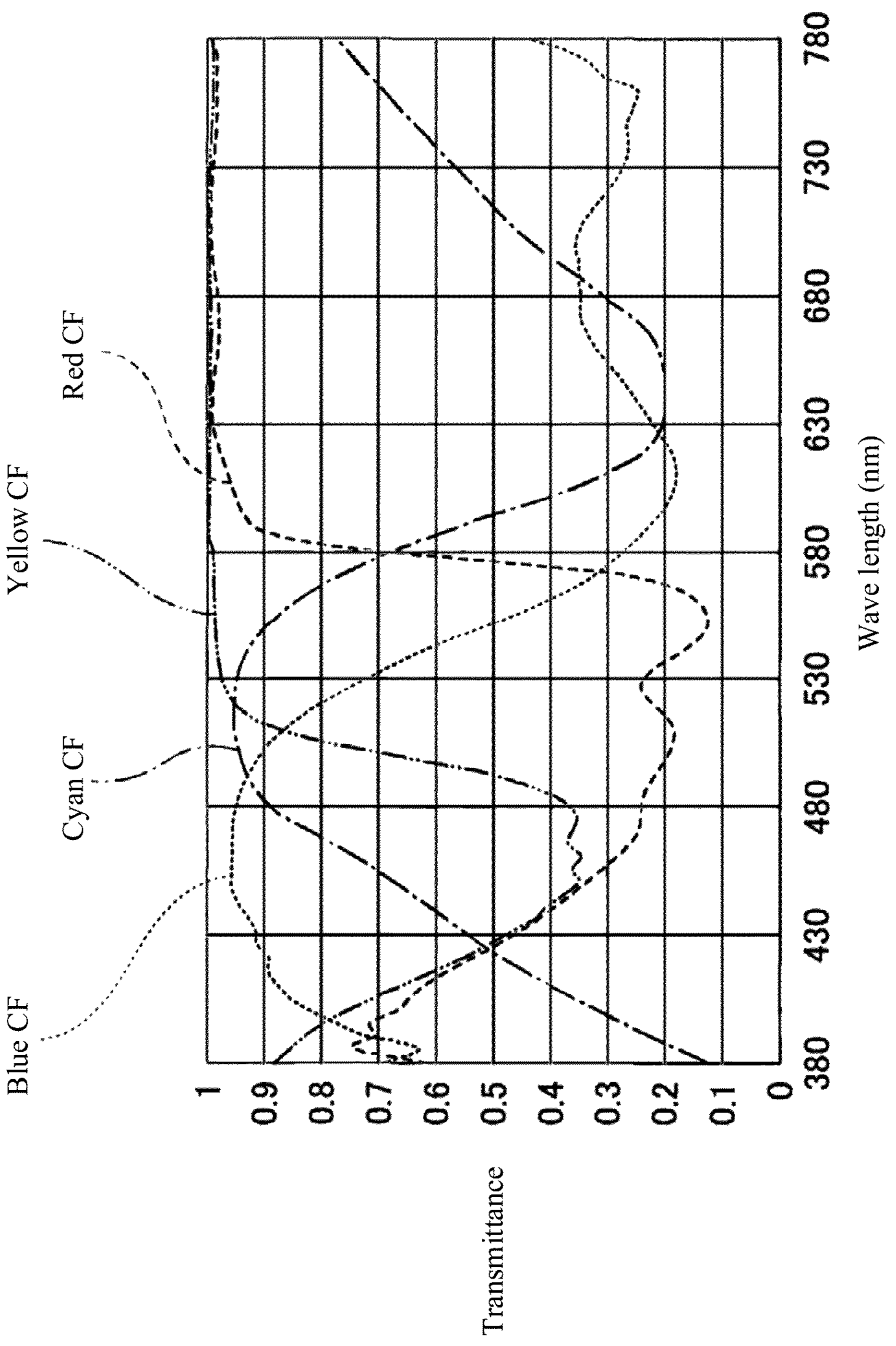

【FIG. 9A】
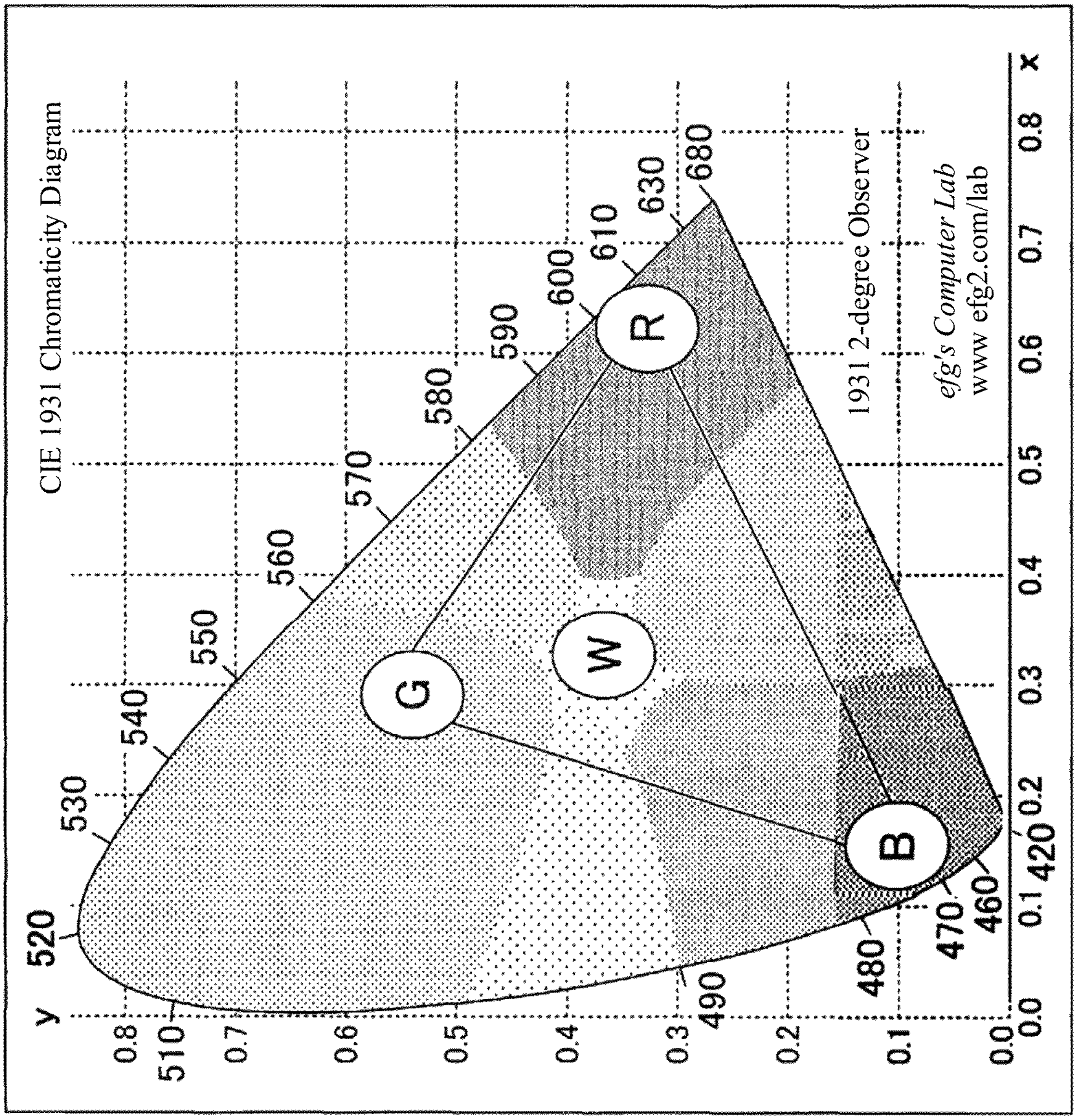

【FIG. 9B】
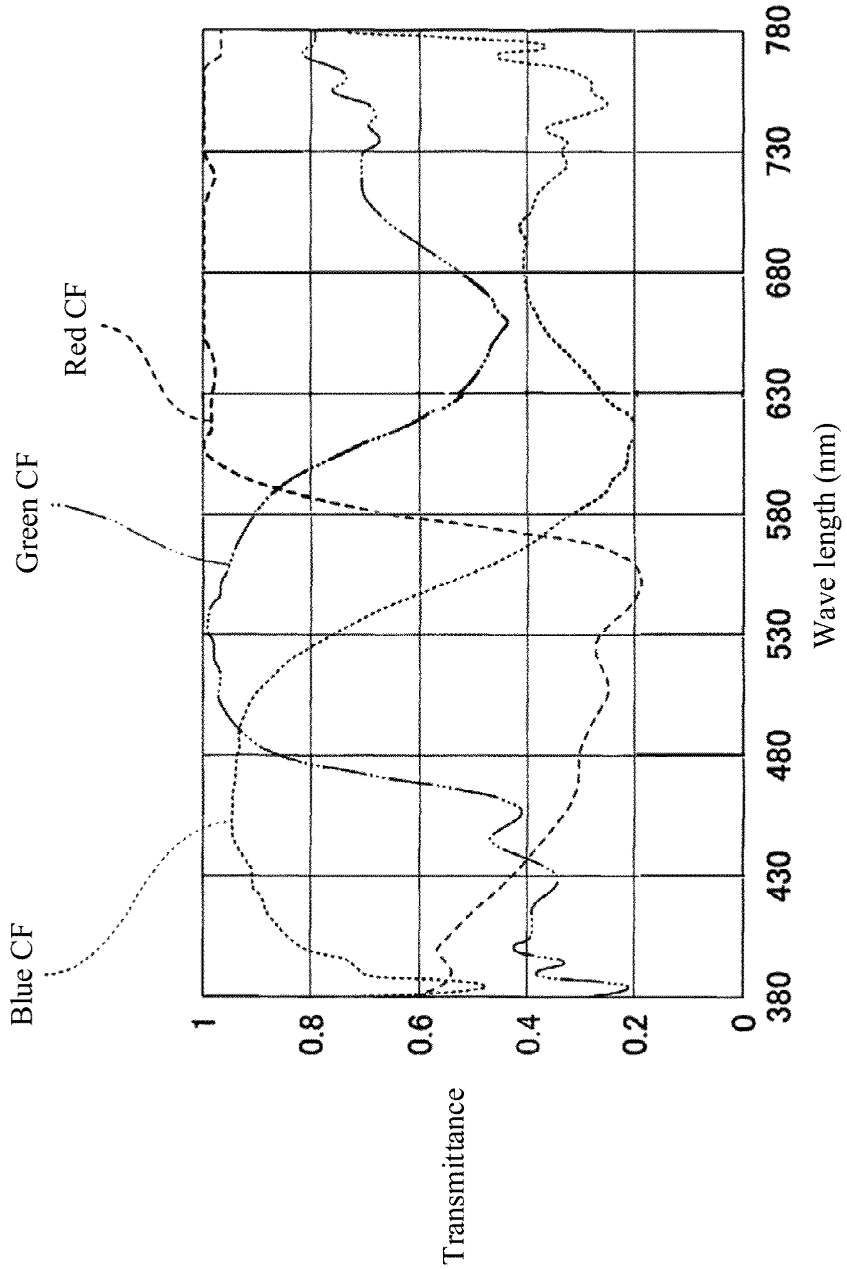

【FIG. 10】
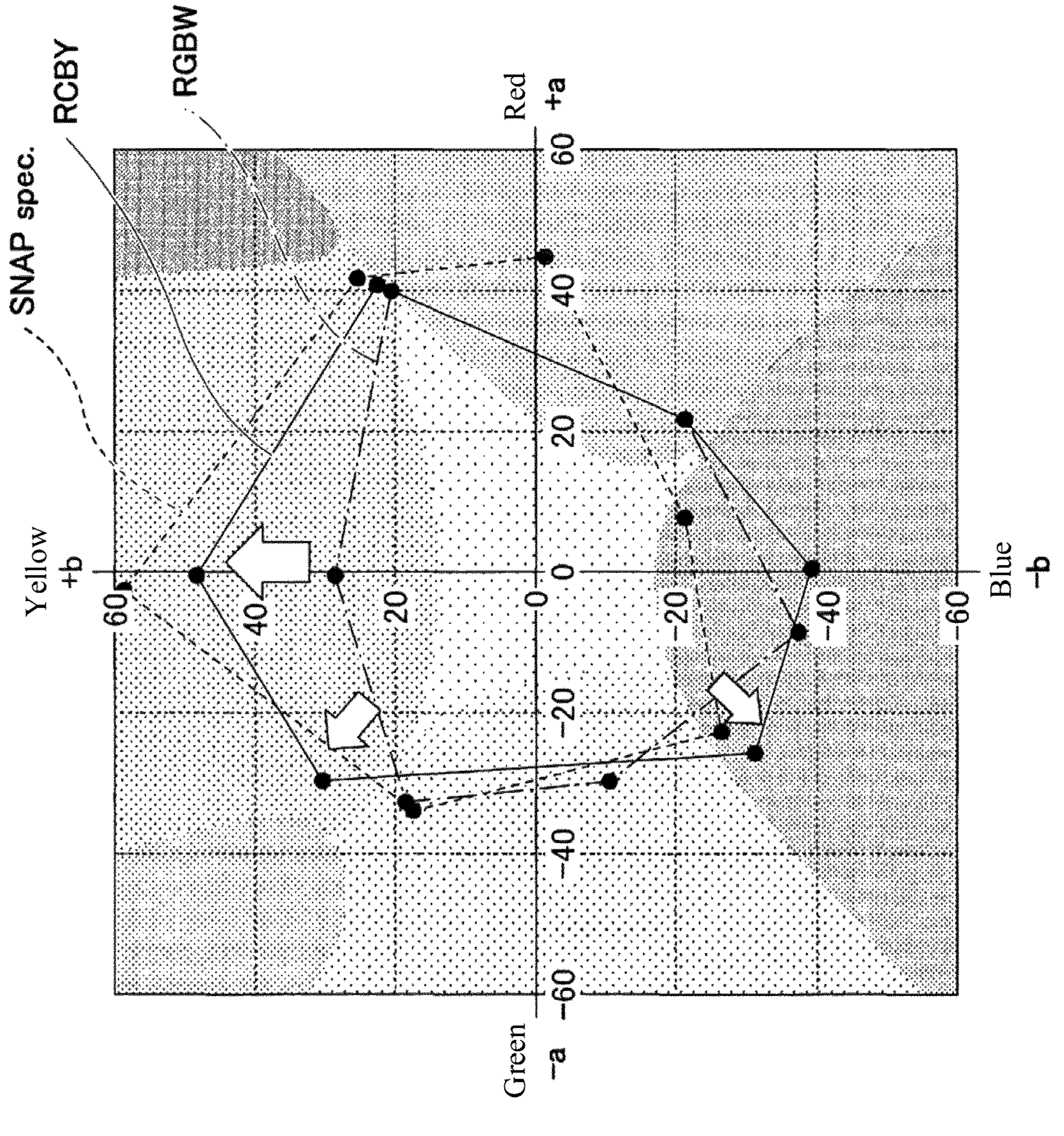

【Fig. 11】
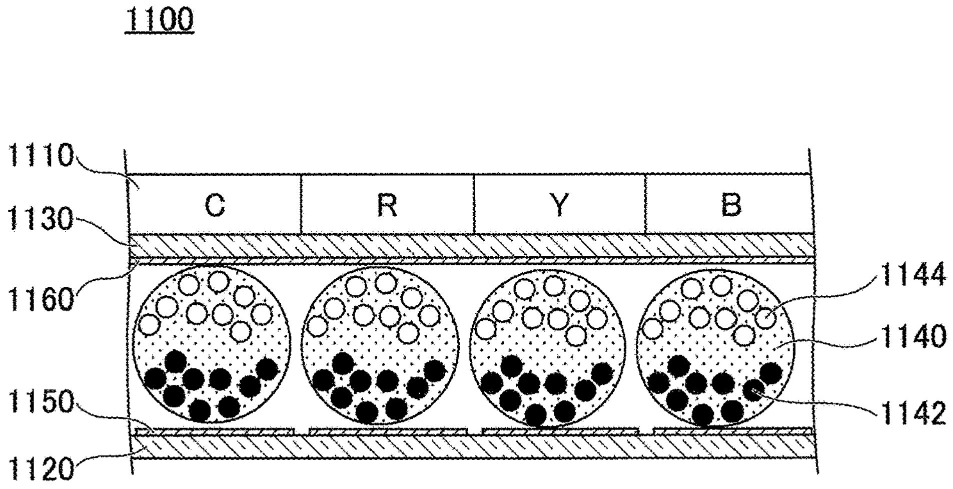
【Fig. 12】
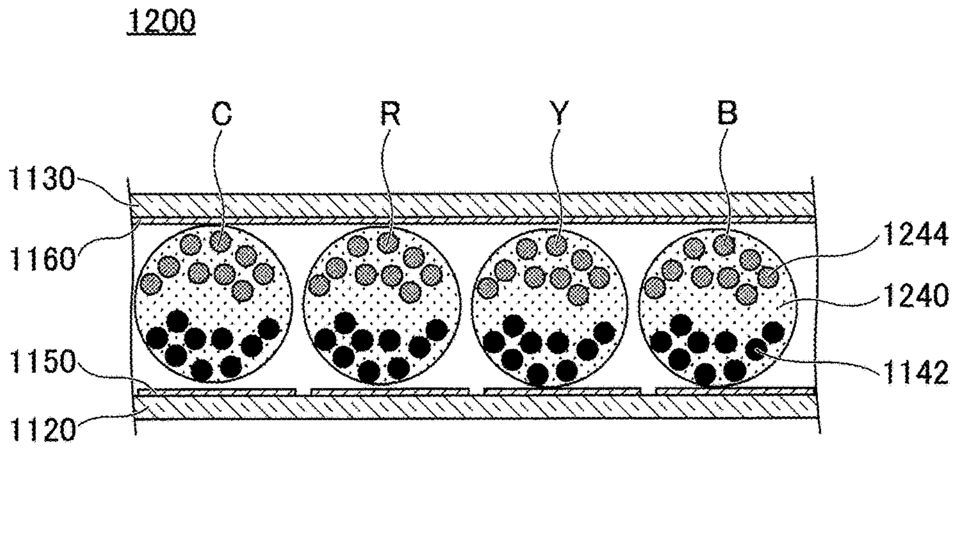

【Fig. 13】
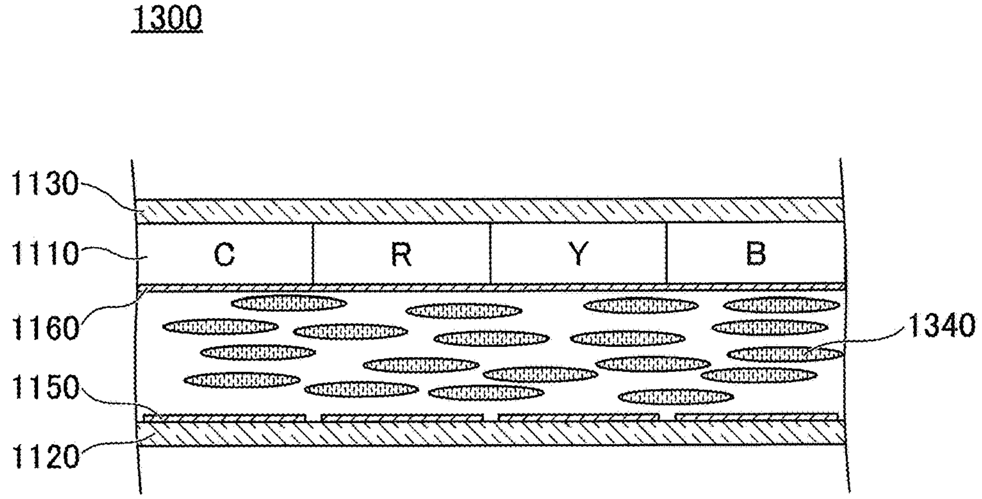
【Fig. 14】
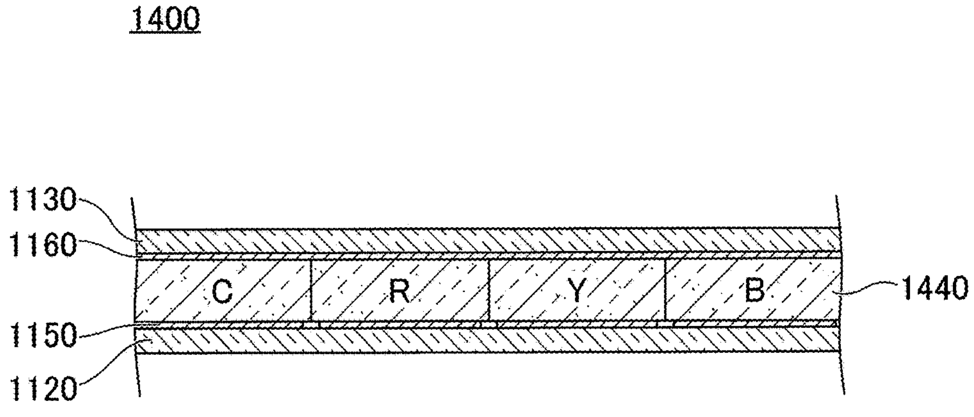

【Fig. 15】
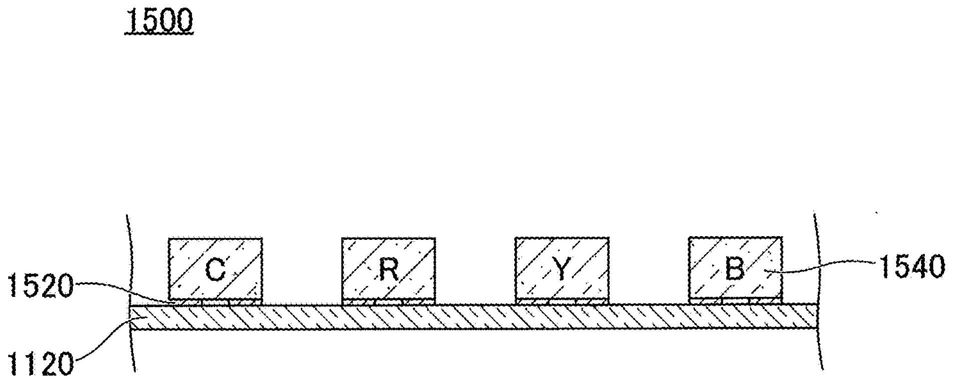
【Fig. 16】
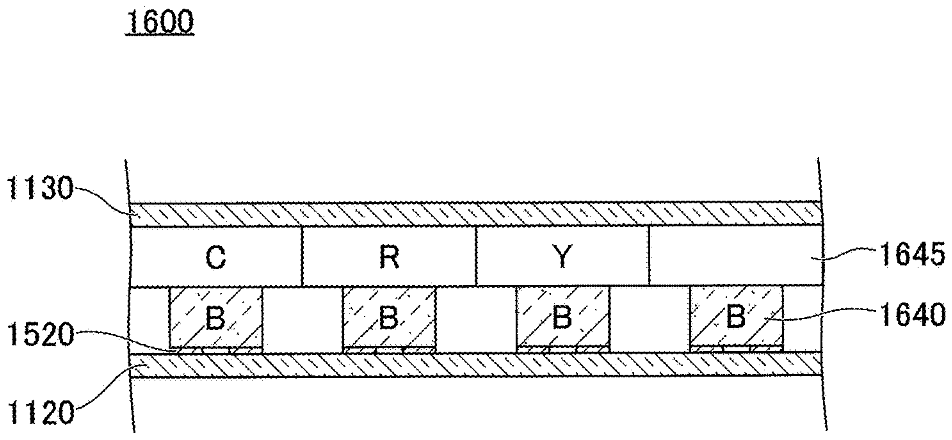

【FIG. 17】
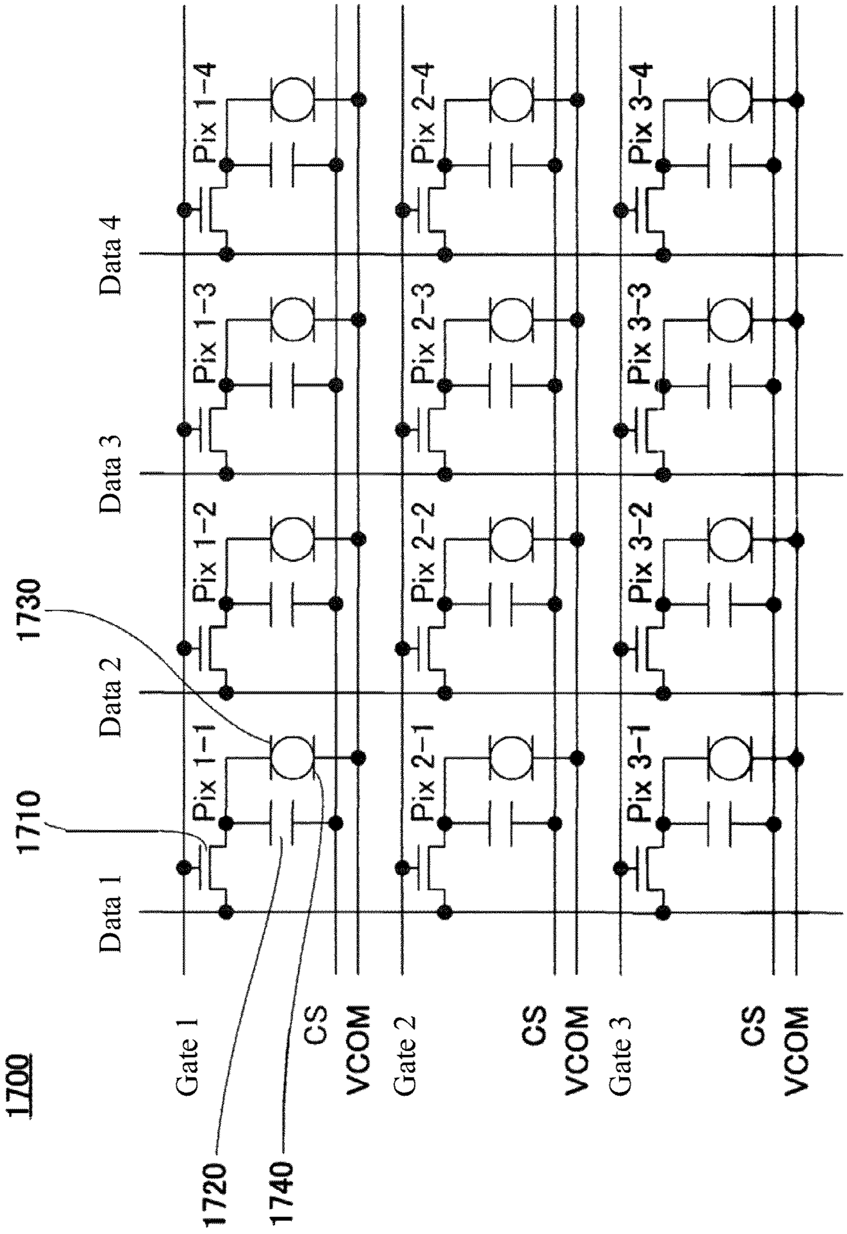

【Fig. 18】
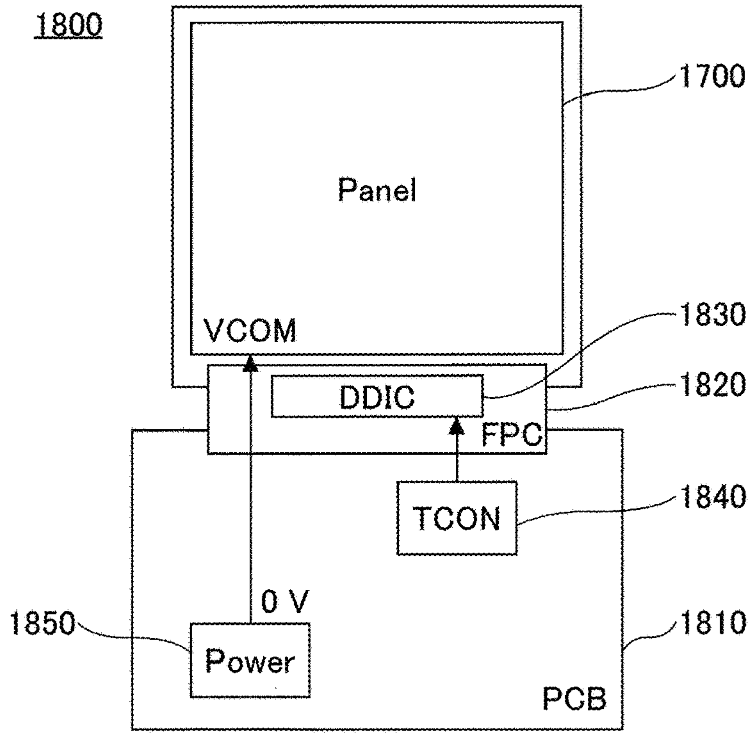
【Fig. 19】
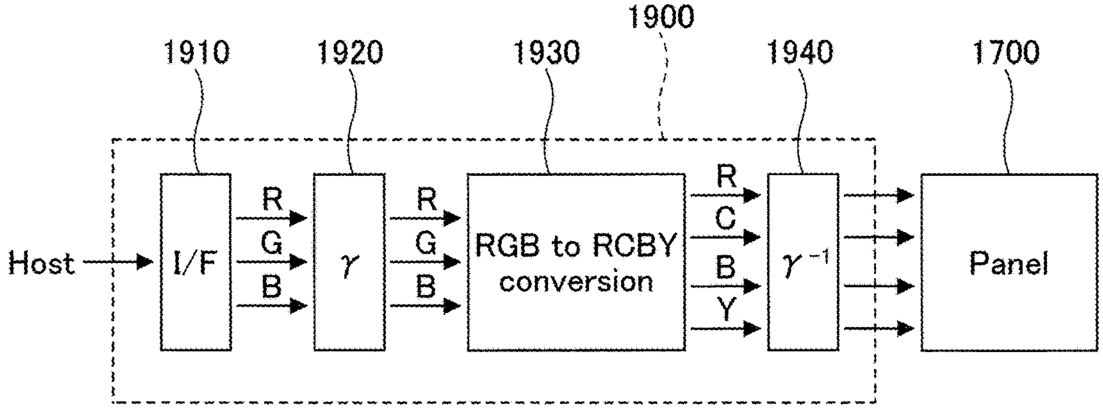

【Fig. 20】
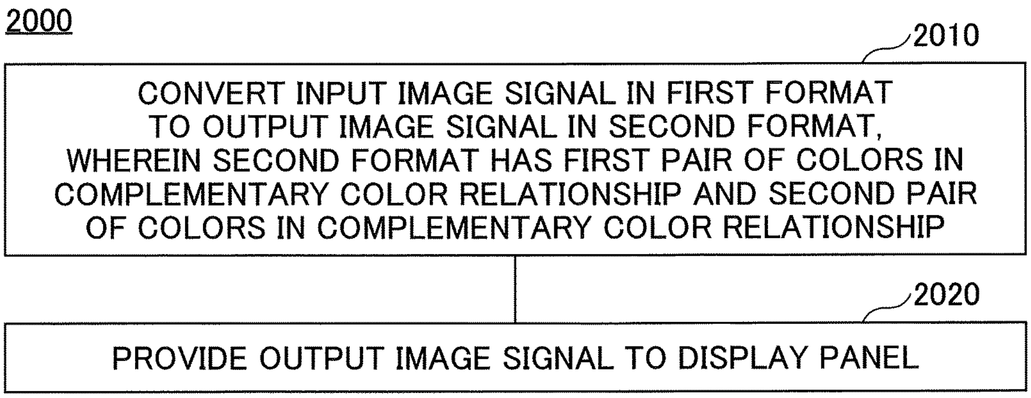
【Fig. 21】
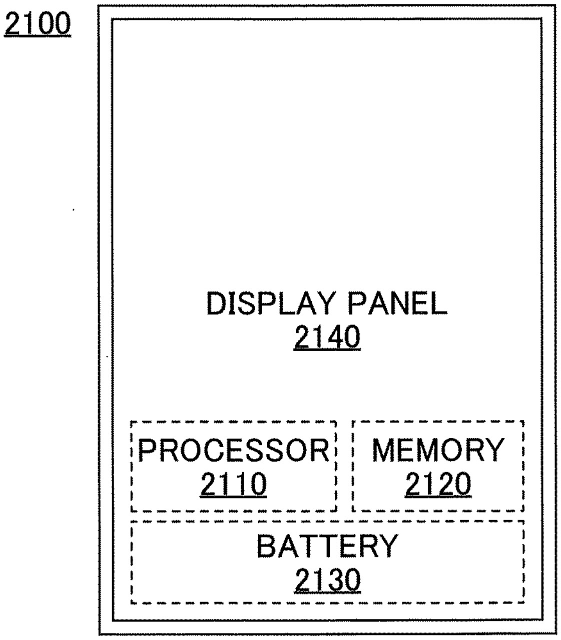

DISPLAY PANEL, METHOD FOR DISPLAYING IMAGE, AND DISPLAY DEVICE

CROSS-REFERENCE TO RELATED APPLICATIONS

This application is a continuation of International Application No. PCT/CN2022/101955, filed on Jun. 28, 2022, which is incorporated herein by reference in its entity.

TECHNICAL FIELD

The present application relates generally to a display device, and more particularly to a display panel in which each pixel unit comprises sub-pixels.

BACKGROUND

The e-book type of products that use a reflective type display, such as an electronic paper display (EPD) or a liquid crystal display (LCD), are widely used. In general, however, the existing products have very poor brightness and color gamut (or color reproducibility) as compared to books printed on paper. The characteristics of brightness and color gamut are in a trade-off relationship due to the display structure and mechanism. For example, the image quality of monochrome or black-and-white (B/W) e-book products are getting closer to that of newspapers, but still lower than that of Gravure printed magazines that use gloss paper.

Existing display devices traditionally utilize RGB 3-primary additive color mixing theory in order to produce full color, that is, each pixel consists of red (R), green (G), and blue (B) sub-pixels. It should be noted that this can apply not only to non-emissive displays (e.g., of a reflective type or of a transmissive type using a backlight), such as EPD and LCD, but also emissive displays, such as organic light emitting diode (OLED) displays and light emitting diode (LED) displays. The RGB colors in some displays, including reflective type displays, are realized by color filters, which may determine the achievable color gamut and reduce the brightness due to their limited transmission.

A known solution to improve the trade-off between the brightness and the color gamut is to add a white (W) sub-pixel into each RGB pixel (i.e., the pixel having the R, G, and B sub-pixels) to make an RGBW pixel. By adding the W sub-pixel having no color filter, the brightness can be increased while the color gamut determined by the RGB 3-primary colors remains substantially the same. However, this known solution reduces the size of each sub-pixel by a factor of ¾, thereby lowering the brightness of each color component. As a result, it cannot increase overall brightness to the extent expected. In addition, there is a limitation in reducing the sub-pixel size due to the need to provide a sub-pixel circuit, which includes a thin film transistor (TFT) and a capacitor, and consequently, there are limitations in pixel size and resolution. For the RGBW pixel, 200 ppi (pixels per inch) may be the limit, while 300 ppi may be the limit for the RGB pixel. Furthermore, the addition of the W sub-pixel increases the number of signal channels required for each pixel by a factor of 4/3, thereby increasing the cost of a display driver integrated circuit (DDIC).

Therefore, another technical solution that can improve the trade-off between the brightness and the color gamut is desired.

SUMMARY

An object of embodiments of the present application is to provide a display panel having a pixel arrangement that can improve the trade-off between the brightness and the color gamut. The embodiments of the present application further provide a method for displaying images using such a display panel and provide a display device including such a display panel.

According to a first aspect, a display panel is provided. The display panel comprises a plurality of pixel units, wherein at least one pixel unit each consists of two sub-pixels, and colors of the two sub-pixels of each of the at least one pixel unit are in a complementary color relationship. For example, the two colors in the complementary color relationship may be selected from a group consisting of: red (R) and cyan (C); blue (B) and yellow (Y); and green (G) and magenta (M). Since each of the at least one pixel unit includes only two sub-pixels, a quantity of circuit elements, such as TFTs and capacitors, in each pixel unit can be decreased. This may lead to compacting the pixel units and increasing the resolution of the display panel.

In a possible implementation of the first aspect, each of the at least one pixel unit may be configured to produce a white point when the two sub-pixels are together set to a first state and produce a black point when the two sub-pixels are together set to a second state. As used herein, the "first state" of a sub-pixel refers to a state for enabling the color associated with the sub-pixel to appear, and the "second state" of a sub-pixel refers to a state for enabling the color associated with the sub-pixel to disappear. Based on the two sub-pixels having complementary colors, the display panel can produce B/W images.

In another possible implementation of the first aspect, each of the at least one pixel unit may be configured to produce a color point associated with one of the two sub-pixels when the one of the two sub-pixels is set to the first state and the other one of the two sub-pixels is set to the second state. This can result in an ability of producing color images.

In another possible implementation of the first aspect, each pixel unit can be independently driven. In this way, the at least one pixel unit, each of which includes only two sub-pixels, may be independently driven on "pixel unit-by-pixel unit" basis to produce high resolution B/W images.

In another possible implementation of the first aspect, each pixel unit may have a centrally-symmetric shape. For example, each pixel unit may be square-shaped or circular-shaped. This may allow for retaining conventional common pixel arrangements.

In another possible implementation of the first aspect, an area ratio of the two sub-pixels in each of the at least one pixel unit may be in a range of 1:3 to 3:1 inclusive. Sizes of the two sub-pixels in each of the at least one pixel unit may be same or different. As an example, the sizes of the sub-pixels may be determined as a function of reflectance, transmittance, color filter spectrum, color particle spectrum, emission efficiency, power consumption, and/or life time. As such, the sizes or area ratio of the two sub-pixels may be flexibly configured depending on various factors, such as constraints on pixel design and/or properties of the respective sub-pixels.

In another possible implementation of the first aspect, the plurality of pixel units comprise at least two different types of pixel units, which are different from one another at least in the colors of the respective sub-pixels. For example, the plurality of pixel units may comprise a plurality of first pixel units and a plurality of second pixel units that are alternately arranged at least in a horizontal direction, the two sub-pixels in each of the first pixel units may have a first pair of colors in a complementary color relationship, and the two sub-pixels in each of the second pixel units may have a second pair of colors in a complementary color relationship, the second pair being different from the first pair. In this manner, the display panel can form a pixel array with sub-pixels of four or more different colors distributed, while each pixel unit has only two sub-pixels of two complementary colors.

In another possible implementation of the first aspect, the plurality of first pixel units and the plurality of second pixel units may be arranged in a checkerboard pattern. This can distribute the sub-pixels of four different colors more uniformly.

In another possible implementation of the first aspect, the first and second pairs may be two of: R and C; B and Y; and G and M. Two certain pairs of complementary colors may allow for representing a larger color gamut, compared to, for example, the conventional RGB or RGBW system. Further, conventional R, G, and/or B light emitting elements or filters may be utilized.

In another possible implementation of the first aspect, the first pair of colors and the second pair of colors both produce white points, each having a CIE 1931 color coordinate (x, y), where x=0.30±0.15 and y=0.33±0.10. As a preferable example, the first pair of colors and the second pair of colors may produce substantially same white points. In this manner, all the pixel units can produce substantially same white points, resulting in high quality images.

In a possible implementation of the first aspect, an area ratio of the two sub-pixels in the first pixel unit may be different from an area ratio of the two sub-pixels in the second pixel unit. This may allow the area ratio among the sub-pixels of four different colors to be flexibly configured depending on various factors, such as emission properties of the respective sub-pixels.

In another possible implementation of the first aspect, the first pixel unit and the second pixel unit adjacent in the horizontal direction may form a color pixel. This allows for producing color images by using color pixels, each consisting of two pixel units adjacent in the horizontal direction, while having an ability of producing B/W images by independently driving each pixel unit. Such color images may not result in a significant degradation of image quality for the human visual system, as will be described below.

According to a second aspect, a method for displaying an image is provided. The method includes converting an input image signal in a first format to an output image signal in a second format, wherein the output image signal in the second format comprises at least two pairs of color signals, each pair of color signals being in a complementary color relationship, at least two pairs of color signals including at least a first pair of color signals and a second pair of color signals, the first pair being different from the second pair. The method further includes providing the output image signal to a display panel. The method of the second aspect allows for using the input image signal in any preferable first format to display images on the display panel according to any of the first aspect or some possible implementations thereof.

In a possible implementation of the second aspect, the first and second pairs may be two of. Rand C; B and Y; and G and M. As an example, input RGB signal can be converted into RCBY signal.

In another possible implementation of the second aspect, the display panel may include a plurality of first pixel units and a plurality of second pixel units that are alternately arranged at least in a horizontal direction, and the providing the output image signal to the display panel may include: providing the first pair of color signals to the plurality of first pixel units; and providing the second pair of color signals to the plurality of second pixel units. As an example, R and C signals can be provided to the first pixel units and B and Y signals can be provided to the second pixel units.

According to a third aspect, a display device is provided, the display device including the display panel according to the first aspect or any possible implementation thereof. The display device further includes a memory configured to store a software program, and a processor configured to execute the software program and to operate the display panel. For technical advantages of the third aspect, reference can be made to the foregoing descriptions of the first aspect and possible implementations thereof.

In a possible implementation of the third aspect, the display device is any of a reflective type display, an emissive type display, or a transmissive type display.

As an example, the display device may be an electronic paper display (EPD). As another example, the display device may be an organic light emitting diode (OLED) display or a light emitting diode (LED) display. As still another example, the display device may be a liquid crystal display (LCD).

BRIEF DESCRIPTION OF DRAWINGS

FIG. 1 is a schematic top view illustrating a pixel arrangement for a display panel according to an embodiment of the present application.

FIG. 2 is a diagram for illustrating colors in a complementary color relationship.

FIGS. 3A and 3B are schematic top views illustrating variations of the pixel arrangement as shown in FIG. 1.

FIGS. 4A and 4B are schematic top views illustrating other variations of the pixel arrangement as shown in FIG. 1.

FIG. 5 is a schematic top view illustrating the principle of producing B/W images with a display panel according to an embodiment of the present application.

FIG. 6 is a schematic top view illustrating the principle of producing color images with a display panel in accordance with an embodiment of the present application.

FIG. 7 is a diagram for illustrating the YUV 4:2:2 format for reference.

FIGS. 8A and 8B show a color gamut and color filters spectra, respectively, for an RCBY pixel according to an embodiment of the present application.

FIGS. 9A and 9B show a color gamut and color filters spectra, respectively, for an RGB pixel for comparison.

FIG. 10 shows a color gamut comparison between an RCBY pixel according to an embodiment of the present application and an RGBW pixel of a conventional solution.

FIGS. 11-16 are schematic cross-sectional views illustrating applications of the display panel according to embodiments of the present application to various display technologies.

FIG. 17 is a circuit diagram illustrating a pixel driving circuit of the display panel according to embodiments of the present application.

FIGS. 18 and 19 are schematic diagrams illustrating a display device architecture according to embodiments of the present application.

FIG. 20 is a flow chart illustrating a method for displaying images according to an embodiment of the present application.

FIG. 21 is a schematic diagram of a display device according to an embodiment of the present application.

Throughout the drawings, same or similar elements are indicated by same or similar reference numerals.

DESCRIPTION OF EMBODIMENTS

To enable any person skilled in the art to better understand objectives, features, and advantages of embodiments of the present application, the following further describes the technical solutions in preferable embodiments of the present application in detail with reference to the accompanying drawings.

In the present application, the terms “first”, “second”, “third”, and the like are intended to distinguish between similar objects, such as regions, elements, or structures, but do not necessarily indicate a particular order or sequence. It should be understood that these terms are interchangeable in proper circumstances. The terms “include”, “comprise”, “have” and any other variants mean to cover the non-exclusive inclusion, for example, a process, method, device, or system that includes a list of steps or elements is not necessarily limited to those steps or elements, but may include other steps or elements not expressly listed or inherent to such a process, method, device, or system. Moreover, the articles “a” and “an” as used in the present application are intended to include one or more items, and may be used interchangeably with “one or more”.

FIG. 1 shows a pixel arrangement for at least a portion of a display panel 100 according to an embodiment of the present application. The display panel 100 comprises an array of pixel units (110, 120), each comprising two sub-pixels (112 and 114, 122 and 124, respectively) of two colors in a complementary color relationship. Such colors in a complementary color relationship can be mixed to produce an achromatic color. Accordingly, each pixel unit of the display panel 100 is capable of producing white when the two sub-pixels thereof are together set to a first state and producing black when the two sub-pixels thereof are together set to a second state. As used herein, the “first state” of a sub-pixel refers to a state for enabling the color associated with the sub-pixel to appear, and the “second state” of a sub-pixel refers to a state for enabling the color associated with the sub-pixel to disappear. The first and second states can vary depending on a specific display technology (see, for example, FIGS. 11-16 described below) applied to the display panel 100. For example, in the first state, the sub-pixel may be supplied with a voltage of a predetermined first polarity (which may be positive or negative polarity) or be turned on. In the second state, the sub-pixel may be supplied with a voltage of a predetermined second polarity (which may be negative or positive polarity) or be turned off.

Referring to FIG. 2, colors in a complementary color relationship are explained by using the International Commission on Illumination (CIE) 1931 chromaticity diagram. On this chromaticity diagram, colors in a complementary color relationship are located opposite to each other with the white point W therebetween. With RGB as a reference, the complementary colors of red R, green G, and blue B may be cyan C, magenta M, and yellow Y, respectively.

Referring again to FIG. 1, the plurality of pixel units of the display panel 100 can include at least two different types of pixel units, which are different from one another at least in the colors of the respective sub-pixels. The at least two different types of pixel units may include a plurality of first pixel units 110 and a plurality of second pixel units 120. The first pixel units 110 and the second pixel units 120 are arranged alternately in at least one of the horizontal and vertical directions. Preferably, they may be arranged alternately in the horizontal direction, and more preferably, alternately in both the horizontal and vertical directions as illustrated in FIG. 1, that is, in a checkerboard pattern.

The two sub-pixels 112, 114 of each first pixel unit 110 have a first pair of colors in a complementary color relationship and the two sub-pixels 122, 124 of each second pixel unit 120 have a second pair of colors in a complementary color relationship. The first pair of colors are different from the second pair of colors. For example, the first and second pairs may be two of R+C, G+M, and B+Y In the illustrated example, the first pixel unit 110 has a C sub-pixel 112 and an R sub-pixel 114, and the second pixel unit 120 has a Y sub-pixel 122 and a B sub-pixel 124. This enables adjacent first pixel unit 110 and second pixel unit 120 (preferably, adjacent in the horizontal direction, as described in more detail below) to form a color pixel 130 having 4-primary colors (CRYB in the example of FIG. 1) (also referred to as “RCBY pixel”, hereinafter).

It should be noted that although such adjacent first pixel unit 110 and second pixel unit 120 together form the color pixel 130, they can be driven independently from each other. That is, the first pixel unit 110 can be controlled to produce an achromatic color independently from the second pixel unit 120, and vice versa.

The pixel units 110, 120, which are driven as individual B/W pixels as described above, may each have any centrally-symmetric shape, such as square or circle. In the example illustrated in FIG. 1, the pixel units 110, 120 may be generally square shaped. Although the two sub-pixels (112 and 114, 122 and 124) of each pixel unit are shown to have the same size in FIG. 1, embodiments of the present application are not limited thereto. For example, the conventional RGB pixel arrangement having equally-divided three sub-pixels may be utilized to provide two sub-pixels (112 and 114, 122 and 124) in 2:1 (or 1:2) area ratio, as shown in FIG. 3A or 3B. The area ratio of the two sub-pixels may be adjusted in a range of 1:3 to 3:1 inclusive, such that sufficient quantities of light can be obtained from both sub-pixels and a white point can be produced when the two sub-pixels are together set to the first state as described above.

In some embodiments, the area ratio of the sub-pixels 112, 114 in the first pixel units 110 may be different from the area ratio of the sub-pixels 122, 124 in the second pixel units 120. It may be preferable that the first pixel units 110 and the second pixel units 120 both produce white points, each having a CIE 1931 color coordinate (x, y), where $x=0.30\pm0.15$ and $y=0.33\pm0.10$. More preferably, the first pixel units 110 and the second pixel units 120 can produce the same white point. Accordingly, in order to bring their white points as close as possible to each other, the respective area ratios in the first pixel units 110 and the second pixel units 120 may be determined depending on transmission characteristics of color filters to be used. Alternatively, or additionally, sizes and/or area ratio of the two sub-pixels may be determined as a function of different factors, such as reflectance, transmittance, color filter spectrum, color particle spectrum, emission efficiency, power consumption, and/or life time, where applicable.

Further, the direction of the sub-pixel partitioning within each pixel unit 110, 120 is not limited to the direction shown in FIG. 1, which results in the horizontally adjacent sub-pixels. The sub-pixels may be partitioned in any preferable manner, for example, as shown in FIG. 4A or 4B. In FIG. 4A, vertically-adjacent sub-pixels may be obtained. In FIG. 4B, each of the first pixel units 110 may comprise vertically-adjacent sub-pixels 112 and 114, while each of the second pixel units 120 may comprise horizontally-adjacent sub-pixels 122 and 124.

FIG. 5 illustrates the principle of producing B/W images with the display panel 100. The pixel arrangement shown in FIG. 3B is used herein as a mere example.

On the left side in FIG. 5, a situation is shown in which both the C and R sub-pixels 112, 114 of all the first pixel units 110 are set to the second state and both the Y and B sub-pixels 122, 124 of all the second pixel units 120 are set to the first state. The second pixel units 120 set to the first state can produce white by the complementary colors Y and B, while the first pixel units 110 set to the second state can produce black. On the right side in FIG. 5, a reverse situation is shown in which all the first pixel units 110 (both the C and R sub-pixels 112, 114) are set to the first state and all the second pixel units 120 (both the Y and B sub-pixels 122, 124) are set to the second state. The first pixel units 110 set to the first state can produce white by the complementary colors C and R, while the second pixel units 110 set to the second state can produce black. Of course, in order to display a given B/W image, the plurality of first pixel units 110 can be driven independently from each other, and the plurality of second pixel units 120 can be driven independently from each other.

As such, by driving pixel units 110, 120 as individual B/W pixels, the display panel 100 can display B/W images on "pixel unit-by-pixel unit" basis. FIG. 5 illustrates that the array of 4×4 pixel units can display a B/W image having 4×4 sampling points. In this manner, if the display panel 100 has an array of m×n pixel units, the display panel 100 can generate and display a B/W image having m×n sampling points.

The display panel 100 can further produce color images within the color gamut determined by the four colors of the four sub-pixels 112, 114, 122, and 124 included in each color pixel 130.

FIG. 6 illustrates the principle of producing color images with the display panel 100. The pixel arrangement shown in FIG. 3B is used also herein as a mere example.

FIG. 6 shows how the following six colors can be generated: red, green, blue, cyan, magenta, and yellow. Since there are R, B, C, and Y sub-pixels in this example, red, blue, cyan, and yellow can be generated by turning on only the R, B, C, and Y sub-pixels, respectively. In addition, green can be produced by turning on the C and Y sub-pixels simultaneously, and the magenta can be produced by turning on the R and B sub-pixels simultaneously. As a result, the color pixels 130, each of which consists of two adjacent pixel units 110 and 120, can represent any color within the specific color gamut as mentioned above.

Thus, the color images are displayed on "color pixel-by-color pixel" basis, rather than "pixel unit-by-pixel unit" basis. FIG. 6 illustrates that the array of 4×4 pixel units displays a color image having 2×4 sampling points by driving two horizontally adjacent pixel units 110 and 120 as a single color pixel 130. In this manner, if the display panel 100 has an array of m×n pixel units, the display panel 100 may generate and display a color image having m/2×n sampling points.

As can be understood by those skilled in the art, this has no significant impact on a total image quality perceived by a user, because the human visual system has a higher resolution capability for B/W images, while it has a lower resolution capability for color images. Moreover, the human eyes have a lower resolution capability in the horizontal direction than in the vertical direction. Indeed, such characteristics of the human visual system are widely utilized in the chroma sub-sampling technique for image compression. Specifically, as shown in FIG. 7, the YUV (or YCbCr) 4:2:2 format, which is well known to those skilled in the art, reduces chrominance (chroma) sampling points by ½ in the horizontal direction while keeping luminance (luma) sampling points, as compared to the high-quality YUV 4:4:4 format. The relationship between the m/2×n sampling points in color images and the m×n sampling points in B/W images as described above is equivalent to relationship between the YUV 4:2:2 and the YUV 4:4:4. As such, color images produced by the display panel 100 do not result in a significant degradation of image quality for the human visual system.

Therefore, it is preferable to form the color pixel 130 with two adjacent pixel units 110 and 120 in the horizontal direction, rather than in the vertical direction.

Next, the following describes an improvement in the trade-off between the brightness and the color gamut (or color reproducibility) by the display panel according to embodiments of the present application (which may be, for example, the display panel 100 shown in FIG. 1).

Again taking the above-described RCBY pixel as an example, FIG. 8A shows color points of these 4-primary colors R, C, B, and Y on the CIE 1931 chromaticity diagram, along with the white point W. FIG. 8B shows transmission spectral ranges of typical color filters (CFs) corresponding to these primary colors R, C, B, and Y For comparison, FIGS. 9A and 9B are diagrams corresponding to FIGS. 8A and 8B, respectively, for RGB 3-primary colors.

The display panel 100 according to embodiments of the present application may allow for covering a wider color gamut by utilizing 4-primary colors (FIG. 8A), instead of 3-primary colors (FIG. 9A). Also, commonly used R, G, and B color filters have relatively large overlaps in their absorption ranges (FIG. 9B) and may decrease the brightness of white light obtained from the RGB pixels. In contrast, the combination of R and C color filters and the combination of B and Y color filters, which are each in a complementary color relationship, can reduce such overlaps in their absorption ranges (FIG. 8B). Accordingly, the first pixel units 110, which comprise the R and C sub-pixels, and the second pixel units 120, which comprise the B and Y sub-pixels, can each increase the brightness of white light. As a result, the display panel 100 can improve the trade-off between brightness and the color gamut.

This can be better understood when comparison is made in the CIE L*a*b* (CIELAB) color space. The CIELAB color space model is closer to the characteristics of the human visual system than the CIE 1931 color space.

As an example, FIG. 10 shows a color gamut comparison between the RCBY pixel according to an embodiment of the present application and the RGBW pixel of the prior solution. FIG. 10 also shows, as an example of industrial standards, the color gamut required by SNAP (Specifications for Newsprint Advertising Production), which is commonly used in the printing industry that uses CMYK color ink system.

As can be seen clearly, the RCBY pixel has a larger color gamut than that of the RGBW pixel. Especially in the yellow area, the color gamut of the RCBY pixel may be significantly extended close to the SNAP requirement. This means that the display panel according to embodiments of the present application has a significant advantage also in color e-book type of products.

The current reflective type EPD panels for e-books have a very low reflectance (leading to a low brightness) and a very poor color gamut. The maximum achievable reflectance and color gamut may be, for example, approximately 25% and 15% NTSC ratio, respectively, when using the traditional RGB pixel, and approximately 30% and 15% NTSC ratio, respectively, when using the RGBW pixel of the prior solution. While on the other hand, the display panel according to embodiments of the present application may allow for achieving performance indicators, for example, 35% reflectance and color gamut greater than 20% NTSC ratio.

Furthermore, each pixel unit of the display panel according to embodiments of the present application includes only two sub-pixels, whereas the RGB pixel includes three sub-pixels and the RGBW pixel includes four sub-pixels. In other words, each pixel unit may include only two TFTs and only two storage capacitors. This may allow each pixel unit to be compacted to increase the resolution of the display panel. For example, while the RGB pixel and the RGBW pixel have resolution limits of about 300 ppi and 200 ppi, respectively, the display panel according to embodiments of the present application allows for achieving a resolution higher than 300 ppi.

In addition, such a decreased number of sub-pixels allows for decreasing the number of signal channels per pixel unit, thereby reducing the cost of the display driver integrated circuit (DDIC).

Referring now to FIGS. 11-16, various structures of the display panel according to embodiments of the present application will be described. FIGS. 11-16 are schematic cross-sectional views illustrating applications of the display panel according to embodiments to various display technologies. These cross-sectional views correspond to the portion of two adjacent pixel units 110 and 120 (i.e., the portion of one color pixel 130) shown in FIG. 1. Through FIGS. 11-16, the RCBY pixel is again used as an example.

FIG. 11 shows an example application to an electrophoretic display. Such an electrophoretic display is commonly used in an electronic paper display (EPD) and may also be referred to as "EPD". The EPD panel 1100 includes the pixel arrangement described above as a color filter layer 1110. The EPD panel 1100 also includes a lower substrate 1120, an upper substrate 1130, and microcapsules 1140 disposed between the lower substrate 1120 and the upper substrate 1130. The lower substrate 1120 includes a pixel drive circuit (not shown herein) and is provided with a plurality of sub-pixel electrodes 1150 on the upper surface facing the microcapsules 1140. Each of the sub-pixel electrodes 1150 corresponds to one sub-pixel. Thus, each of the sub-pixel electrodes 1150 is aligned with a corresponding one of the R, B, C, and Y filters of the color filter layer 1110. The upper substrate 1130 is a transparent substrate, the lower surface of which is provided with a transparent common electrode 1160 for the plurality of sub-pixels.

It should be understood that FIG. 11 shows one microcapsule 1140 for each sub-pixel, however in practice, tens of microcapsules 1140, for example, may be provided within each sub-pixel. Each microcapsule 1140 encapsulates a dispersion liquid containing black (BLK) particles 1142 and white (W) particles 1144, and the BLK and W particles 1142 and 1144 are charged to opposite polarities. Thus, The EPD panel 1100 can display a given B/W image or color image in such a manner as described in connection with FIGS. 5 and 6, by controlling voltages applied to the sub-pixel electrodes 1150 to move the particles 1142 and 1144 in the microcapsules 1140. As an example, in a case where the BLK particles 1142 are positively charged and the W particles 1144 are negatively charged, a negative voltage applied to the sub-pixel can cause the W particles 1144 to move upwardly such that the W particles 1144 are visible to a user or a viewer of the EPD panel 1100. For the EPD panel 1100, applying a voltage to a sub-pixel so as to make the W particles 1144 visible may correspond to setting the sub-pixel to the first state.

FIG. 12 shows another example application to an electrophoretic type display. The EPD panel 1200 includes same or similar components as those in the EPD panel 1100 shown in FIG. 11. Such components are indicated by same or similar reference numerals and will not be described again herein.

The EPD panel 1200 does not include the color filter layer 1110 shown in FIG. 11, but instead includes color particles 1244 in the microcapsules 1240. Specifically, the microcapsules 1240 in the C, R, Y, and B sub-pixels contain C, R, Y, and B particles 1244, respectively, along with BLK particles 1142. Similar to the EPD panel 1100 shown in FIG. 11, the EPD panel 1200 can display a given B/W image or color image by controlling voltages applied to the sub-pixel electrodes 1150 to move the particles 1142 and 1244 in the microcapsules 1240. For the EPD panel 1200, applying a voltage to a sub-pixel so as to make the color particles 1244 visible may correspond to setting the sub-pixel to the first state.

FIG. 13 shows an example application to a liquid crystal display (LCD). The LCD panel 1300 includes same or similar components as those in the EPD panel 1100 shown in FIG. 11. Such components are indicated by same or similar reference numerals and will not be described again herein.

The LCD panel 1300 does not include microcapsules but instead includes a liquid crystal layer 1340. In embodiments of the present application, the liquid crystal layer 1340 may comprise any of various types known to those skilled in the art. The LCD panel 1300 can display a given B/W image or color image by controlling voltages applied to the sub-pixel electrodes 1150 to change light transmission through the liquid crystal layer 1340. For the LCD panel 1300, applying a voltage to a sub-pixel such that the liquid crystal layer 1340 can transmit light may correspond to setting the sub-pixel to the first state.

FIG. 14 shows an example application to an organic light emitting diode OLED) display. The OLED display panel 1400 includes same or similar components as those in the EPD panel 1100 shown in FIG. 11. Such components are indicated by same or similar reference numerals and will not be described again herein.

The OLED display panel 1400 is of emissive type and does not require a color filter layer, like the color filter layer 1110 shown in FIGS. 11 and 13. The C, R, Y, and B sub-pixels include OLED layers 1440 that emits light of C, R, Y, and B colors, respectively, between the sub-pixel electrodes 1150 and the transparent common electrode 1160. The OLED display panel 1400 can display a given B/W image or color image by controlling voltages applied to the sub-pixel electrodes 1150 and thus light emissions from the respective OLED layers 1440. For the OLED display panel 1400, turning-on the OLED layer 1440 in a sub-pixel to emit light may correspond to setting the sub-pixel to the first state.

It should be noted that the structure of the OLED display panel 1400 shown in FIG. 14 is also applicable to a quantum dot (QD) display of emissive type.

FIG. 15 shows an example application to a light emitting diode (LED) display. The LED display panel 1500 includes same or similar components as those in the EPD panel 1100 shown in FIG. 11. Such components are indicated by same or similar reference numerals and will not be described again herein.

The LED display panel 1500 is also of emissive type and does not require a color filter layer, like the color filter layer 1110 shown in FIGS. 11 and 13. The C, R, Y, and B sub-pixels include LED dies 1540 that emits light of C, R, Y, and B colors, respectively. In the example shown in FIG. 15, the LED dies 1540 are flip-chip dies and the lower substrate 1120 in each sub-pixel is provided with at least two electrodes 1520 connected to the anode and cathode of the corresponding LED die. The LED display panel 1500 can display a given B/W image or color image by controlling voltages applied to the electrodes 1520 in the sub-pixels and thus light emissions from the respective LED dies 1540. For the LED display panel 1500, turning-on the LED die 1540 in a sub-pixel to emit light may correspond to setting the sub-pixel to the first state.

FIG. 16 illustrates another example application to an LED display. The LED display panel 1600 includes same or similar components as those in the LED display panel 1500 shown in FIG. 15. Such components are indicated by same or similar reference numerals and will not be described again herein.

The LED display panel 1600 includes a blue LED die 1640 in each sub-pixel. The LED display panel 1600 also includes color conversion layers 1645 of different colors above the blue LED dies 1640. The color conversion layers 1645 may be supported by a transparent upper substrate, like the upper substrate 1130 shown in FIG. 11. The color conversion layers 1645 in the C, R, and Y sub-pixels can convert blue light from the underlying blue LED dies 1640 to cyan, red, and yellow, respectively. The color conversion layer 1645 in the B-sub pixel may be transparent to blue light from the underlying blue LED die 1640. Thus, this may be omitted or may not include any color conversion material. The LED display panel 1600 can display a given B/W image or color image by controlling voltages applied to the electrodes 1520 in the sub-pixels and thus light emissions from the respective blue LED dies 1640 under the color conversion layers 1645. For the LED display panel 1600, turning-on the blue LED die 1640 in a sub-pixel to emit light may correspond to setting the sub-pixel to the first state.

FIG. 17 is a circuit diagram illustrating a pixel driving circuit of the display panel 1700 according to embodiments of the present application. The display panel 1700 may be, for example, any of the display panels 1100-1600 shown in FIGS. 11-16. This circuit diagram shows the portion of a 4×3 array of sub-pixels (e.g., sub-pixels 112, 114, 122, and 124 in FIG. 1). In other words, since each pixel unit comprises two sub-pixels, this circuit diagram corresponds to the portion of a 2×3 array of pixel units (e.g., pixel units 110 and 120 in FIG. 1). This may also correspond to the portion of a 1×3 array of color pixels (e.g., color pixel 130 in FIG. 1), when two horizontally adjacent pixel units form a color pixel.

The driving circuit in each sub-pixel may include a TFT 1710, a storage capacitor 1720, a sub-pixel electrode 1730, and a common electrode 1740. The drain of the TFT 1710 is connected to corresponding one of a data lines (e.g., Data1, 2, 3, 4, . . . ) and the source of the TFT 1710 is connected to corresponding one electrode of the storage capacitor 1720 and the sub-pixel electrode 1730. The gate of the TFT 1710 is connected to one of gate lines (e.g., Gate1, 2, 3, 4, . . . ). The common electrode 1740 may be connected to corresponding one of common voltage (VCOM) lines and the other electrode of the storage capacitor 1720 may be connected to corresponding one of storage capacitor (CS) lines. It should be noted that the other electrode of the storage capacitor 1720 may be connected to the VCOM line as with the common electrode 1740, and in that case the CS lines may be omitted.

According to embodiments of the present application, two sub-pixels in each pixel unit are configured to receive data voltages for two colors in a complementary color relationship, ss described above. In addition, two adjacent pixel units are configured to receive data voltages for different pairs of complementary colors. Thus, when driving a given gate line (e.g., Gate1), data lines Data1 and Data2 can be provided with data voltages for two colors (e.g., R and C) in a complementary color relationship, and data lines Data3 and Data4 can be provided with data voltages for two other colors (e.g., B and Y) in a complementary color relationship. Accordingly, the display panel 1700 will be provided with a 4-primary color (e.g., RCBY) signal.

Referring now to FIGS. 18 and 19, an exemplary display device architecture for generating such a 4-primary color (e.g., RCBY) signal is described.

FIG. 18 schematically shows a display device 1800 according to an embodiment of the present application. The display device 1800 includes a panel, which may be the display panel 1700 as described with reference to FIG. 17. The display device 1800 may also include a printed circuit board (PCB) 1810 and a flexible printed circuit board (FPC) 1820 that connects the display panel 1700 to the PCB 1810. The FPC 1820 may allow for the display panel 1700 and the PCB 1810 to be placed back-to-back within a housing (not shown in FIG. 18) of the display device 1800.

The display device 1800 may further include a DDIC 1830, a timing controller (TCON) 1840, and a power supply circuit 1850. The DDIC 1830 may be mounted near the display panel 1700, for example, on the FPC 1820 as illustrated. Alternatively, the DDIC 1830 may be mounted or formed on a substrate of the display panel 1700 itself. The TCON 1840 may be mounted on the PCB 1810 and provide various signals to the DDIC 1830 and optionally to the display panel 1700. The power supply circuit 1850 may be provided on the PCB 1810 and provide one or more power supply voltages and a ground voltage to the DDIC 1830 and the display panel 1700. For example, the power supply circuit 1850 may directly supply the ground voltage, as the common voltage, to the common voltage (VCOM) lines (FIG. 17) of the display panel 1700.

Referring to FIG. 19, the 4-primary color (e.g., RCBY) signal provided to the display panel 1700 may be generated by a processing circuit 1900, such as an Intellectual Property (IP) circuit, in the DDIC 1830 or the TCON 1840. The IP circuit 1900 may include an interface (I/F) 1910 for receiving an input image signal from host side, a gamma ($\gamma$) circuit 1920, a conversion circuit 1930, and an inverse gamma ($\gamma^{-1}$) circuit 1940. As an example, the input image signal may be RGB signal and the 4-primary color signal provided to the display panel 1700 may be RCBY signal. In this case, the conversion circuit 1930 is configured to perform RGB-RCBY conversion. The $\gamma$ circuit 1920 and the $\gamma^{-1}$ circuit 1940 perform gamma correction, which is well known to those skilled in the art and will not be described in detail herein.

The IP circuit 1900 can provide the generated RCBY signal to the display panel 1700. More specifically, the IP circuit 1900 may provide a first pair of R and C signals in a complementary color relationship to first pixel units (e.g., the first pixel units 110 in FIG. 1) of the display panel 1700, and a second pair of B and Y signals in a complementary color relationship to second pixel units (e.g., the second pixel unit 120 in FIG. 1) of the display panel 1700. The display panel 1700 can then display images based on the RCBY signal received from the IP circuit 1900.

FIG. 20 is a flow chart illustrating a method 2000 for displaying images according to an embodiment of the present application. The method 2000 may be performed by a processing circuit, such as the IP circuit 1900 shown in FIG. 19.

In step 2010, the method 2000 includes converting an input image signal in a first format to an output image signal in a second format. The image signal in the second format comprises a first pair of color signals in a complementary color relationship and a second pair of color signals in a complementary color relationship. The first pair of color signals is different from the second pair of color signals. That is, the first and second pairs of color signals together provide a 4-primary color signal.

For example, the first pair of color signals and the second pair of color signals are two of: red (R) and cyan (C) signals; blue (B) and yellow (Y) signals; and green (G) and magenta (M) signals. In a specific example, the input image signal is RGB signal, the first pair of color signals are R and C signals, and the second pair of color signals are B and Y signals.

At step 2020, the method 2000 includes providing the output image signal to a display panel. The first pair of color signals in a complementary color relationship may be provided to a plurality of first pixel units (e.g., the first pixel units 110 in FIG. 1), and the second pair of color signals in a complementary color relationship may be provided to a plurality of second pixel units (e.g., the second pixel units 120 in FIG. 1) that are alternately arranged with the plurality of first pixel units. It should be noted that if the display panel supports three or more pairs of color signals, another embodiment of the present application can provide three or more pairs of color signals as the image signal in the second format.

Referring now to FIG. 21, there is shown a schematic diagram of a display device 2100 in accordance with an embodiment of the present application. In some embodiments, the display device 2100 may be a battery-powered mobile device, such as an e-book reader, a smartphone, a smartwatch, a tablet computer, a laptop computer, or the like. In other embodiments, the display device 2100 may be a device that is generally connected to utility power, such as a television or a monitor, or a device that is generally connected to an external battery, such as an in-vehicle display. Further, the display device 2100 may be any other device, such as a digital signage device, regardless of the type of power supply.

In the example illustrated in FIG. 21, the display device 2100 includes a processor 2110, a memory 2120, a battery 2130, and a display panel 2140. The display panel 2140 may be assembled with a housing of the display device 2100 in such a manner that the front surface of the display panel 2140 is visible from a user of the display device 2100, as shown by solid lines in FIG. 21. The processor 2110, the memory 2120, and the battery 2130 may be contained within the housing, as indicated by dashed lines in FIG. 21. The processor 2110, the memory 2120, the battery 2130, and the display panel 2140 may be electrically connected to each other.

Although not shown, the display device 2100 may optionally include a radio frequency (RF) circuit, a speaker, a microphone, an input device, a sensor, a camera, an antenna, a near field communication module, and/or the like.

The processor 2110 may be configured to invoke a software program and data stored in the memory 2120 and execute the software program to perform various functions and/or data processing of the display device 2100. The processor 2110 may include any suitable special-purpose or general-purpose processing device or unit. Additionally, the processor 2110 may include any suitable number of processors. For example, the processor 2110 may include one or more of a microprocessor, a microcontroller, an application processor, a central processing unit (CPU), a graphics processing unit (GPU), a digital signal processor (DSP), an application-specific integrated circuit (ASIC), a Field Programmable Gate Array (FPGA), and the like. In an example, the processor 2110 may include a processor(s) in the DDIC 1830 and a processor(s) in the TCON 1840 shown in FIG. 18 and perform the method 2000 shown in FIG. 20.

The memory 2120 may be configured to store a software program and data, and may include any suitable medium that may be accessed by the processor 2110. Additionally, the memory 2120 may include memory in any suitable number. The memory 2120 can include volatile memory and/or non-volatile memory, and may include, for example, a random access memory (RAM), a read-only memory (ROM), and/or a flash memory. It should be noted that the term "memory" as used herein may refer to a mass storage that can store large amounts of data, including contents to be displayed on the display panel 2140. Therefore, the memory 2120 may also include, for example, a hard disk drive (HDD), a solid state drive (SDD), an optical disk drive, or the like.

The battery 2130 may be configured to supply power to each of components of the display device 2100, such as the processor 2110, the memory 2120, and the display panel 2140. The processor 2110 may run a power management program or module stored in the memory 2120 to control power consumption of one or more components, as well as, charging and discharging of the battery 2130. In addition to, or instead of, the battery 2130, the display device 2100 may have a power connector, adapter, or the like, which is connected to an external power supply, such as utility power.

The display panel 2140 may be configured to display a variety of information and content, including information entered by a user and information provided for the user. The display panel 2140 may include a user input device, such as a touch screen, on at least a part of the surface exposed from the housing.

The display panel 2140 may be, for example, the display panel 100 as shown in FIG. 1. Therefore, each pixel unit of the display panel 2140 may have two sub-pixels of two colors in a complementary color relationship and improve the trade between brightness and color gamut.

Although some preferred embodiments of the present application have been described, persons skilled in the art may make changes and modifications to these embodiments without departing from the scope of present disclosure. Therefore, the following claims are intended to be construed as to cover all changes and modifications falling within the scope of the present disclosure. It is also noted that the errors of the values and ranges caused by engineering implementation are also within the scope of the present disclosure.

The invention claimed is:

1. A display panel comprising a plurality of pixel units, wherein each of the plurality of pixel units consists of two sub-pixels, and colors of the two sub-pixels of each of the at least one pixel unit are in a complementary color relationship;

wherein the plurality of pixel units comprise a plurality of first pixel units and a plurality of second pixel units that are alternately arranged at least in a horizontal direction, wherein two sub-pixels in each of the first pixel units are vertically-adjacent sub-pixels and have a first pair of colors in a complementary color relationship, and wherein two sub-pixels in each of the second pixel units are horizontally-adjacent sub-pixels and have a second pair of colors in a complementary color relationship, the second pair of colors being different from the first pair of colors.

2. The display panel of claim 1, wherein each of the plurality of pixel units is configured to produce a white point when the two sub-pixels are together set to a first state.

3. The display panel of claim 2, wherein each of the plurality of pixel units is configured to produce a black point when the two sub-pixels are together set to a second state.

4. The display panel of claim 3, wherein each of the plurality of pixel units is configured to produce a color point associated with one of the two sub-pixels when the one of the two sub-pixels is set to the first state and the other one of the two sub-pixels is set to the second state.

5. The display panel of claim 1, wherein each of the plurality of pixel units is independently driven.

6. The display panel of claim 1, wherein each of the plurality of pixel units has a centrally-symmetric shape.

7. The display panel of claim 6, wherein each of the plurality of pixel units is square-shaped.

8. The display panel of claim 1, wherein the area ratio of the two sub-pixels in each of the plurality of pixel units is determined as a function of at least one of reflectance, transmittance, color filter spectrum, color particle spectrum, emission efficiency, power consumption, or life time.

9. The display panel of claim 1, wherein the plurality of pixel units comprise at least two different types of pixel units, which are different from one another at least in the colors of the respective sub-pixels.

10. The display panel of claim 1, wherein the plurality of first pixel units and the plurality of second pixel units are arranged in a checkerboard pattern.

11. The display panel of claim 1, wherein the first pair of colors and the second pair of colors are two of: red and cyan; blue and yellow; and green and magenta.

12. The display panel of claim 1, wherein the first pair of colors and the second pair of colors both produce white points, each having an International Commission on Illumination (CIE) 1931 color coordinate (x, y), where x=0.30±0.15 and y=0.33±0.10.

13. The display panel of claim 1, wherein the first pair of colors and the second pair of colors produce same white points.

14. The display panel of claim 1, wherein an area ratio of the two sub-pixels in the first pixel unit is different from an area ratio of the two sub-pixels in the second pixel unit.

15. The display panel of claim 1, wherein an area ratio of the two sub-pixels in each of the plurality of pixel units is in a range of 1:3 to 3:1 inclusive.

16. A display device comprising:

a display panel comprising a plurality of pixel units, wherein each of the plurality of pixel units consists of two sub-pixels, and colors of the two sub-pixels of each of the at least one pixel unit are in a complementary color relationship;

wherein the plurality of pixel units comprise a plurality of first pixel units and a plurality of second pixel units that are alternately arranged at least in a horizontal direction, wherein two sub-pixels in each of the first pixel units are vertically-adjacent sub-pixels and have a first pair of colors in a complementary color relationship, and wherein two sub-pixels in each of the second pixel units are horizontally-adjacent sub-pixels and have a second pair of colors in a complementary color relationship, the second pair of colors being different from the first pair of colors;

a memory configured to store a software program; and a processor configured to execute the software program and to operate the display panel.

17. A display device of claim 16, wherein an area ratio of the two sub-pixels in each of the plurality of pixel units is larger than 1:1, and less than or equal to 3:1.

* * * * *